United States Patent [19]

Valdespino et al.

[11] 4,082,249
[45] Apr. 4, 1978

[54] RECREATIONAL VEHICLE LEVELING AND SUPPORT SYSTEM

[76] Inventors: Joseph M. Valdespino, 5023 Golfclub Pkwy.; Ronald A. Brandl, 3040 N. Pine Hills Rd., both of Orlando, Fla. 32808

[21] Appl. No.: 814,554

[22] Filed: Jul. 11, 1977

[51] Int. Cl.² .............................................. B66F 7/26
[52] U.S. Cl. ..................................................... 254/45
[58] Field of Search .................... 254/86 H, 45, 93 R; 280/763, 6 H; 180/41

[56] References Cited

U.S. PATENT DOCUMENTS

| | | | |
|---|---|---|---|
| 3,338,554 | 8/1967 | Gostomski | 254/45 |
| 3,350,063 | 10/1967 | Thurlow | 254/45 |
| 3,360,141 | 12/1967 | Martin | 254/45 |
| 3,415,490 | 12/1968 | Steele | 254/45 |
| 3,955,797 | 5/1976 | Richards | 254/93 R |

Primary Examiner—Robert C. Watson
Attorney, Agent, or Firm—Duckworth, Hobby, Allen & Pettis

[57] ABSTRACT

A leveling and support system for recreational vehicle operates on water cylinders powered by a community water supply or a recreational vehicle water tank. A plurality of water cylinders are mounted to the recreational vehicle in pre-determined positions for leveling and supporting the vehicle. The cylinders are each connected through a branch valve to a main valve which in turn, is connected to a source of water under pressure. Each branch valve controls the operations of one water cylinder and the main valve supplied either water pressure or a suction through the branch valves to the water cylinders. The water cylinders have an operative position for supporting a vehicle and a stored position for travel with means for locking the cylinders in the stored position once the vehicle has been leveled.

15 Claims, 4 Drawing Figures

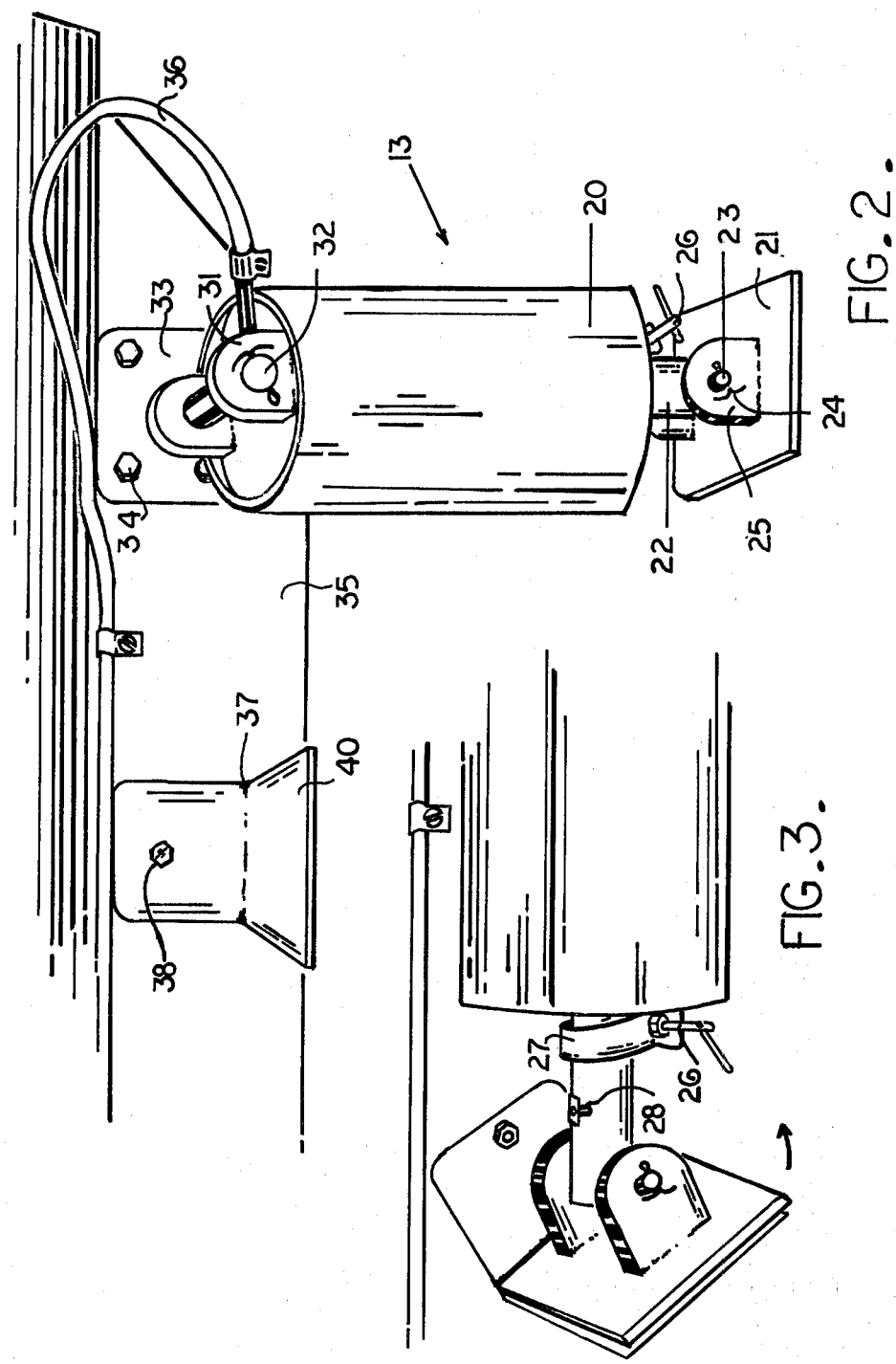

RECREATIONAL VEHICLE LEVELING AND SUPPORT SYSTEM

BACKGROUND OF THE INVENTION

1. Field of the Invention

The present invention relates to recreational vehicles and especially to a system for leveling and supporting a recreational vehicle utilizing a source of water under pressure.

2. Description of the Prior Art

A variety of recreational vehicles are available on the market including small and large campers for attachment to the back of a family automobile for camping for short or extended periods of time; large motor homes and fifth-wheel campers, which do not have front wheels and are suspended by a "fifth-wheel" to the back of a pick-up truck. This latter vehicle requires front end support when disconnected from the truck.

One of the problems encountered by most recreational vehicles is supporting the front end or tongue of the camper when the recreational vehicle is disconnected from the family car or other towing vehicle. The support must be adjustable to allow the vehicles to be adjusted for different heights to maintain the inside of the recreational vehicle level.

In addition, on the smaller campers the springs are such that the campers tend to be unstable and shake considerably when positioned in a campground or the like. These problems are dealt with by hand actuated jacks which may be placed under the tongue of a camper or mounted to the front portion of the fifth wheel camper which may be hand actuated to raise or lower the front portion of the vehicle. On smaller campers that tend to be unstable, a series of smaller hand operated jacks are sometimes positioned on the four corners and each jack operated to get the camper level and supported by the jacks so that the camper will not rock when walking from one side to the other of the camper.

In addition to the hand actuated jacks that are commonly used or supplied with recreational vehicles, auxilliary jacks have been available which are actuated by electric motors for raising and lowering a portion of the vehicle. These, however, require connection to electrical power annd are expensive to purchase as an option to the recreational vehicles. Finally, large semi-trailers having fifth wheels have air over hydraulic jacks for supporting the trailers when disconnected from the cab portion and which are actuated by the truck's air system.

The present invention on the other hand, provides a simple series of water cylinders permanently attached to the recreational vehicle and having an operative and a stored position and which may be quickly moved from the stored traveling position to the operative position and operated by valves for leveling and supporting the recreational vehicle by the use of a pressure from the community or campground water supply or from the recreational vehicle's water tank. A typical water tank includes enough water pressure to level the vehicle for at least one occasion in a remote location.

SUMMARY OF THE INVENTION

A recreational vehicle leveling and support system has a connection for a source of water under pressure which is connected to a plurality of water cylinders connected to the recreational vehicle in pre-determined positions through a main valve and through one branch valve for each water cylinder. The main valve and the branch valves can be used in conjunction to level the recreational vehicle by raising and lowering the water cylinder rods.

Each cylinder has a provision for locking the cylinder rod in position for supporting the vehicle once the vehicle is level, or the vehicle can be supported by the water pressure locked in the water cylinder. The main valve has a direct connection to the branch valves for directing water pressure to the cylinders and has an alternate connection through a venturi into a drain so that connection to the branch valve becomes an aspirating line whereby switching to the drain line will create a suction for lifting the water cylinders. Each water cylinder is also provided with means for connecting the cylinder in its stored position.

BRIEF DESCRIPTION OF THE DRAWINGS

Other objects, features and advantages of the present invention will be apparent from the written description and the drawings in which

FIG. 2 is a perspective view of a water cylinder in accordance with FIG. 1, attached to a recreational vehicle in its operative position.

FIG. 3 is a perspective view of portion of the cylinder of FIG. 2 in its stored position.

DESCRIPTION OF THE PREFERRED EMBODIMENT

Figure 1:
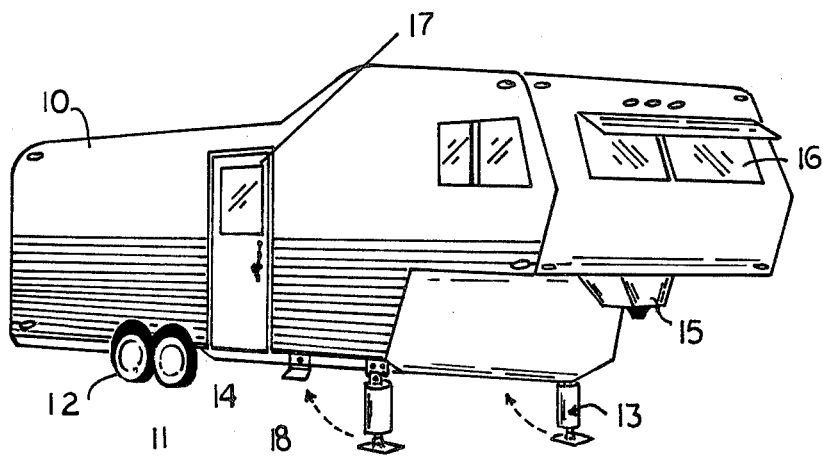
FIG. 1 is a perspective view of a fifth wheel trailer incorporating a preferred embodiment of the present invention.

Referring to the drawings and especially to FIG. 1, a fifth wheel recreational vehicle 10 is illustrated positioned on a surface 11 supported by wheels 12, and a pair of support cylinders 13 which are attached to the chassis 14 of vehicle 10.

Recreational vehicle 10 has its fifth wheel pin 15 mounted to the front portion thereof and has windows 16 and a door 17.

The fifth wheel pin 15 connects to a supporting fifth wheel mounted on a pick-up truck, or the like, for towing the recreational vehicle 10 on trips. The cylinders 13 have associated brackets 18 for positioning the cylinder 13 in a stored position for travel, as more clearly illustrated in FIGS. 2 and 3.

FIG. 2 illustrates the water cylinder 13 in its operative position having a cylinder 20, a foot 21 attached to a cylinder rod 22 by a pin 23 held by cotter pin 24 to a foot bracket 25. Cylinder rod 22 has a clamping screw 26 for locking a locking clamp 27 of FIG. 3 to the rod 22 adjacent to cylinder 20 for supporting the cylinder when the water is removed through a drain cock 28. The drain cock 28 connected to the interior of the cylinder 20 by a channel through the cylinder rod 22. Cylinder 20 is mounted at the other end by a shaft 30 mounted on brackets 31, by cotter pins 32. Shaft 30 is attached to a support flange 33 which is bolted with bolts 34 to the chassis 35 of a recreational vehicle. Cylinder 20 has a single water line 36 connected thereto for actuation of the cylinder.

A storage support bracket 37 is rotably mounted by single bolt 38 and is "L" shaped having a platform portion 40 so that by rotating the bracket 37 ninety degrees and lifting the cylinder assembly 13 on the shaft 30, the foot 21 can be positioned adjacent the storage platform 40 of the bracket 37 at which time the bracket can be rotated back to a level position by rotating the foot 21 on the pin 23 as illustrated in FIG. 3, to support the cylinder assembly 13 in a stored position. This simple locking mechanism only requires twisting of the bracket 37 to release the stored cylinder which is then dropped to its operative position as in FIG. 2. Thus, the cylinder is stored as in FIG. 3 when the vehicle is being transported and is quickly lowered into the position of FIG. 3 where the cylinder assembly 13 can be actuated to support chassis 35 of the recreational vehicle to any desired height by the travel of the cylinder rod 22.

Figure 4:
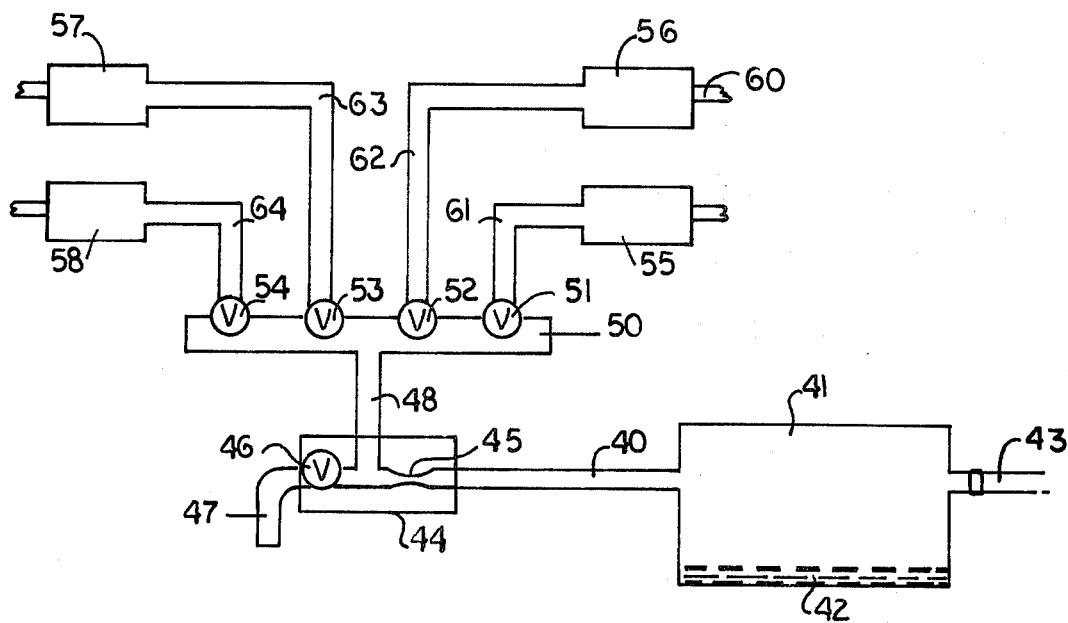
FIG. 4 is a diagrammatic view of the control system of the present invention.

Cylinder 20 includes a piston (not shown) connected to the cylinder rod 22 which is actuated by the water in cylinder 13, which is driven by a water source under pressure. The operation of the cylinder is illustrated in connection with FIG. 4, having the cylinders connected by a line 40 from the recreational vehicle water tank 41 which is normally maintained with water 42 under pressure and which is connected to an ordinary community or campsite water hose 43 when the recreational vehicle is parked for the night or a longer period.

The water from the hose 43 fills the tank 41 and maintains the pressure therein. Alternatively some water tanks have an auxilliary pump to maintain the water pressure when the recreational vehicle is being taken to remote locations.

Water in the line 40 passes through a main valve 44 having a venturi 45 located therein and a valve element 46 connecting the line 40 to a drain 47 which may then be drained directly on to the earth. When the valve 46 is closed, water from the line 40 is directed through the line 48 which connects to the main valve 44 adjacent the venturi 45 and to a manifold assembly 50 having branch valves 51, 52, 53 and 54, one for each of the respective water cylinders 55, 56, 57 and 58. Each of the water cylinders drives a cylinder rod 60. Thus, the water is directed under pressure to the manifold 50 where each of the valves 51 through 54 may be actuated to drive any one of the water cylinders 55 through 58 which may be located on four corner portions of the camper, or in the case of a fifth wheel camper of FIG. 1, only two water cylinders would be required.

The water cylinders 55 through 58 are thus actuated on and off until the four corners of the camper are aligned at which time the valves can be turned off locking the water in the cylinders and supporting the camper, which is thereby stabilized against rocking motion. In the smaller campers, however, if the camper is to be maintained in position for a long period of time, especially in freezing weather, it is desirable to drain the cylinders 55 through 58 and this is accomplished through the drain cock (FIG. 3) after the clamp 27 is locked by the threaded member 26 to clamp the rod 22 adjacent cylinder 20. To raise the cylinder rods 22 and the feet 21 (FIG. 2) for returning the cylinder 13 to the stored position, the valves 51 through 54 are opened and valve 46 opened to direct the water from tank 41 through the drain 47.

Inasmuch as the venturi 45 has the line 48 mounted adjacent thereto, suction is generated in line 48 and in each of the lines 61, 62, 63 and 64, thereby raising the cylinder rods 22 without the need for springs, or the like, in the cylinders themselves. This also allows for the use of only a single line connected to each cylinder assembly 13. Once the rods are raised, the valve 46 is closed and the cylinder assembly 13 may be rotated and connected to the support bracket 37.

The present invention can, advantageously, be attached to existing recreational vehicles or can be added to new recreational vehicles without departing from the spirit and scope of the invention. It should also be clear that the present leveling and support system can be attached in different manners than those illustrated. Accordingly, the present invention is not to be construed as being limited to the particular forms disclosed herein which are to be regarded as illustrative rather than restrictive.

We claim:

1. A recreational vehicle leveling and support system comprising in combination:

a source of water under pressure;

at least one water cylinder connected to a recreational vehicle in a pre-determined position, said water cylinder having an operative position and a storage position for travel;

valve means having a valve connected to said source of water under pressure and to said water cylinder for controlling said water cylinder responsive to operation of said valve means, said valve having a venturi therein connecting said water under pressure through said venturi and out a drain in one position thereof, and to said water cylinder in a second position thereof for raising and lowering a portion of said recreational vehicle; and means for locking each said water cylinder in position following leveling of said recreational vehicle whereby said recreational vehicle may be supported in a level position.

2. The apparatus in accordance with claim 1, in which said valve means includes an individual branch valve for each of a plurality of water cylinders.

3. The apparatus in accordance with claim 1 in which said valve means includes a branch valve manifold connected adjacent to said venturi in said main valve.

4. The apparatus in accordance with claim 3 in which said plurality of water cylinders includes four water cylinders.

5. The apparatus in accordance with claim 2 in which said recreational vehicle is a fifth wheel vehicle having two water cylinders mounted thereto.

6. The apparatus in accordance with claim 1, in which each of said plurality of water cylinders has a cylinder rod having a locking clamp mounted thereon for locking said cylinder rod in different positions to said water cylinder.

7. The apparatus in accordance with claim 1 in which each said water cylinder has a cylinder rod and a rotatable foot attached thereto.

8. The apparatus in accordance with claim 7 in which said recreational vehicle has a rotatable support bracket mounted thereto positioned to receive said rotatable foot for holding said cylinder thereto in a stored position.

9. The apparatus in accordance with claim 8 in which said source of water under pressure includes a line attached to the water tank of the recreational vehicle.

10. A recreational vehicle leveling and support system comprising in combination:

a source of water under pressure;

a plurality of water cylinders connected to a recreational vehicle in pre-determined positions, each said water cylinder having an operative position and a storage position for travel, and each said water cylinder having a drain valve connected thereto for draining said water cylinders;

valve means connected to said source of water under pressure and to each water cylinder for controlling said water cylinder responsive to operation of the valves, whereby a recreational vehicle may be leveled; and means for locking each said water cylinder in position following leveling of said recreational vehicle whereby said recreataional vehicle may be supported in a level position.

11. The apparatus in accordance with claim 10, in which each drain valve is connected in the cylinder rod of said cylinder for draining water through said cylinder rod.

12. A leveling support system comprising in combination:

a source of water under pressure;

valve control means connected to said source of water and having a main valve and branch valves connected thereto;

water cylinders positioned in spaced relationship to each other and each being operatively connected through one central branch valve to said main valve, whereby each water cylinder can be controlled in one direction by the operation of one branch valve; and said main valve being operatively connected to a second line to create a negative pressure on said branch valves whereby said branch valves can control said water cylinder in a second direction.

13. The apparatus in accordance with claim 12, in which said main valve includes a venturi therein having a connection for each said branch valve connected adjacent thereto whereby negative pressure is generated when water is directed through said venturi out said drain.

14. The apparatus in accordance with claim 13 in which each of said plurality of water cylinders is mounted to a recreational vehicle for raising and lowering portions of said recreational vehicle for leveling and supporting said vehicle.

15. The apparatus in accordance with claim 14 in which said leveling and support system has two water cylinders mounted to a fifth wheel recreational vehicle.

* * * * *